United States Patent
Lee et al.

(10) Patent No.: US 6,459,824 B1
(45) Date of Patent: Oct. 1, 2002

(54) METHOD OF RETRIEVING MOVING PICTURES USING JOINT POINTS BASED ON POSE INFORMATION

(75) Inventors: Han Kyu Lee; Jin Woong Kim, both of Daejon-Shi (KR)

(73) Assignee: Electronics and Telecommunications Research Institute, Daejon-Shi (KR)

(*) Notice: Subject to any disclaimer, the term of this patent is extended or adjusted under 35 U.S.C. 154(b) by 0 days.

(21) Appl. No.: 09/350,390

(22) Filed: Jul. 9, 1999

(30) Foreign Application Priority Data

Jul. 22, 1998 (KR) .............................. 98-29492

(51) Int. Cl.[7] .................... G06K 9/54; G06T 17/00; H04N 5/225; H04N 1/00; G06F 7/00
(52) U.S. Cl. ..................... 382/305; 382/103; 382/118; 382/190; 382/201; 382/203; 382/209; 382/219; 345/420; 345/706; 345/949; 345/953; 345/968; 348/155; 348/169; 348/220; 358/403; 707/1; 707/3; 707/104.1
(58) Field of Search .................... 382/103, 118, 382/173, 181, 190, 201, 203, 204, 209, 217, 219, 224, 229, 239, 243, 276, 291, 305; 345/420, 474, 706, 949, 951, 953, 968; 348/97, 102, 220, 135, 152, 155, 169; 386/46, 69; 707/1–6, 100–102, 103 R, 104.1; 375/240, 240.1; 358/403

(56) References Cited

U.S. PATENT DOCUMENTS 5,635,982 A * 6/1997 Zhang et al. ............... 348/231
5,655,117 A * 8/1997 Goldberg et al. ........... 707/102
5,684,886 A  11/1997 Kamada et al. ............. 382/107
5,751,286 A   5/1998 Barber et al. ............... 345/835
5,930,783 A * 7/1999 Li et al. ......................... 707/1
6,054,999 A * 4/2000 Strandberg .................. 345/474
6,256,418 B1 * 7/2001 Rehg et al. .................. 382/236

OTHER PUBLICATIONS

Somliar, et al. "Content based video indexing and image retrieval", IEEE, pp. 1–22, 1994.*
F. Liu et al., "Periodicity, directionality, and randomness: Wold Features for Image Modeling and Retrieval", Mar., 1995, pp. 1–23.
John R. Smith et al., "Tools and Techniques for Color Image Retrieval", Feb., 1996, pp. 1–12.

* cited by examiner

Primary Examiner—Leo Boudreau
Assistant Examiner—Daniel G. Mariam
(74) Attorney, Agent, or Firm—Cohen, Pontani, Lieberman & Pavane

(57) ABSTRACT

There is disclosed a method of retrieving moving pictures using joint point based moving information for allowing an user to retrieve pictures including a desired person object or the pose of the person object for still picture/moving picture data of multimedia data. The method of retrieving moving pictures using joint points based on pose information according to the present invention comprises the steps of extracting and expressing joint points for the joint point model against pictures where a major person exists from moving pictures or still pictures which are the object of retrival by means of joint points model based indexing apparatus, and retriving the person object according to the joint points extracted by said joint point model based indexing apparatus.

6 Claims, 3 Drawing Sheets

US 6,459,824 B1

METHOD OF RETRIEVING MOVING PICTURES USING JOINT POINTS BASED ON POSE INFORMATION

BACKGROUND OF THE INVENTION

1. Field of the Invention

The present invention relates to a method of retrieving moving pictures using joint points based on pose information for allowing a user to retrieve pictures including a desired person object or the pose of the person object from still pictures or moving pictures.

2. Description of the Prior Art

A conventional information retrieval method employs mainly a keyword based retrieval method using texts, as can be seen from web retrieval in the internet. However, as video and audio compression technology advances, it is necessary that the user can retrieve his/her desired information among large-capacity multimedia information.

The conventional information retrieval method can be called one of keyword retrieval methods using note to multimedia data based on a keyword. Also there has been proposed another retrival method using basic picture characteristics such as color, material, etc. However, the keyword retrieval method has a drawback that an available language is limited. Also the method has limitations in reflecting the contents of real multimedia data because it uses only the basic picture characteristic. In particular, since the objects such as persons are important content objects appearing in various genres such as movies, sports, etc, it is difficult for user to perform the retrival based on the contents of a person for which he/her desires to retrive from the person object, using the conventional technology.

SUMMARY OF THE INVENTION

It is an object of the present invention to solve the problems involved in the prior art, and to provide a method of retrieving moving pictures using joint points based on pose information, which can extract and represent joint points on joint point models from pictures existing in a desired major person the user desires among larger-capacity moving pictures/still pictures which are objects for retrieval, and retrives the person object using the extracted joint points.

To achieve the above object, the method of retrieving moving pictures using joint points based on pose information according to the present invention comprises the steps of extracting and expressing joint points for the joint point model against pictures where a major person exists from moving pictures or still pictures which are the object of retrieval by means of joint points model based indexing apparatus, and retrieving the person object according to the joint points extracted by said joint point model based indexing apparatus.

The present invention can be applied to all the other objects having joint points characteristic, for example animals such as hoarse, lion, etc., as well as person or personified objects.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF PREFERRED EMBODIMENT

Now, the present invention will be explained in detail by reference to the accompanying drawings.

Figure 1:
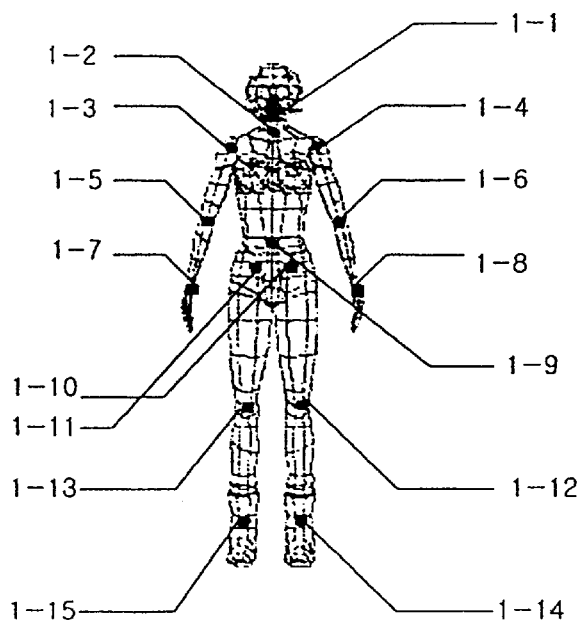
FIG. 1 shows one embodiment of joint points model for a person object.

FIG. 1 shows one embodiment of joint points model for a person object. In the drawing, the major joint points for a person object are a total of 15 where they are joint points from 1(1-1) to 15(1-15). The above joint points are not limited to 15 but more than 15 joint points can be modeled for more detailed expression of poses.

Figure 2:
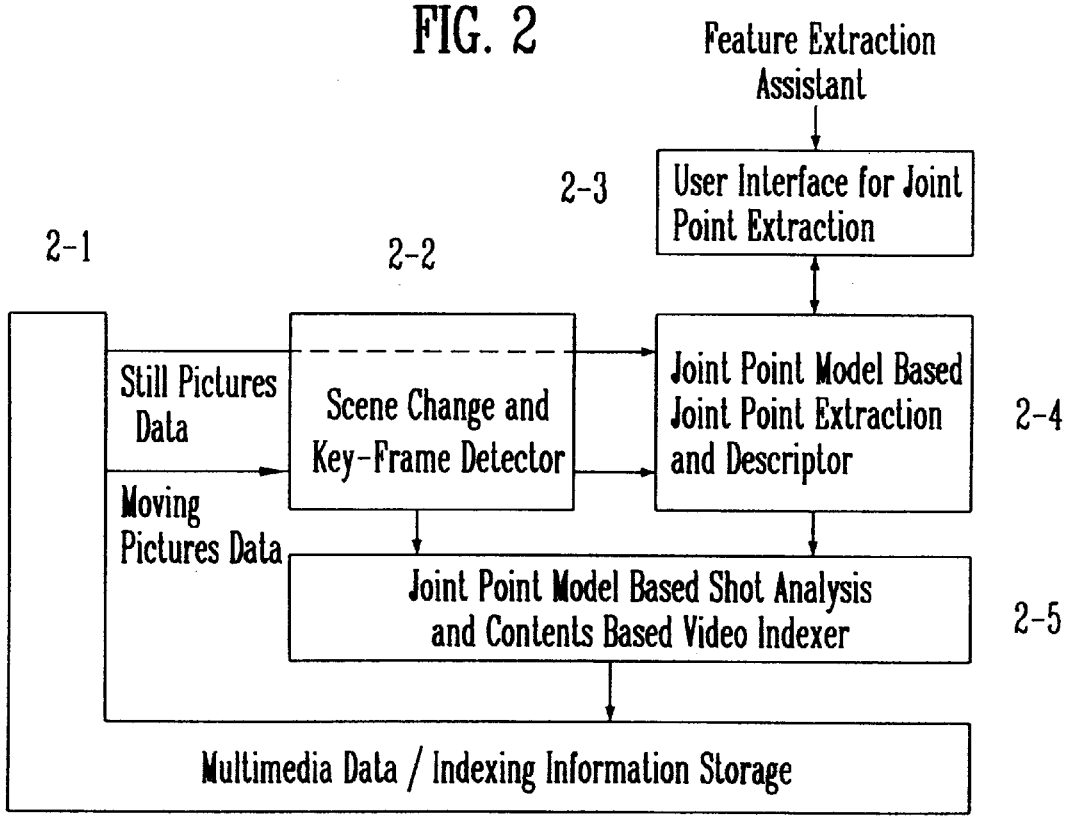
FIG. 2 is a structural view of joint points based indexing apparatus.

FIG. 2 is a structural view of joint points based indexing apparatus. Assuming that moving pictures/still pictures data to become the object of retrieval are stored at a storage, it performs joint points extraction and contents based indexing process.

In FIG. 2, a reference numeral 2-1 is a moving picture/still picture data and indexing information storage, 2-2 is a scene change and key-frame detector, 2-3 is a user interface for joint point extraction, 2-4 is joint points model based joint point extraction and descriptor and 2-5 is joint points model based shot analysis and contents based video indexer.

Moving pictures from the moving pictures/still pictures data and indexing information storage 2-1 are input to the scene change and key-frame detector 2-2, which then divides the moving pictures into each time axis with shot by scene switching and then determines representative pictures corresponding to each shot. The shot is defined as a collection of pictures having a series of continuity which are arranged along the time axis within the moving pictures, in which respective shots are divided each other by the scene switching. The representative picture may be defined as a representative picture capable of representing the shots within one shot, in which more than one picture may exist per each shot. The reason for performing screen switching and representative picture detection against the moving pictures is that it requires a heavy work for a user to extract joint points using joint points model for all the pictures existing in a major person, in case of performing the joint point extraction of the present invention in a semi-manual way or in a manual way. Also, that is because that it can significantly reduce the amount of work necessary for extracting the joint point if the moving sequences are divided into shots and only joint point for the major person are extracted only against the representative pictures. In case of still picture, it is directly input into the joint point model based joint point extraction and descriptor 2-4 without passing through the scene change and key-frame detector 2-2.

The input to the joint point model based joint point extraction and descriptor 2-4 is a detected representative picture in case of moving pictures, but it is still pictures in case of still pictures. Furthermore, if there exists a person object within the input picture, joint points can be extracted through the user interface for joint point extraction 2-3 in case of manual/semi-manual detection. In case of automatic detection, the joint point is automatically extracted without intervention of the user.

Figure 3:
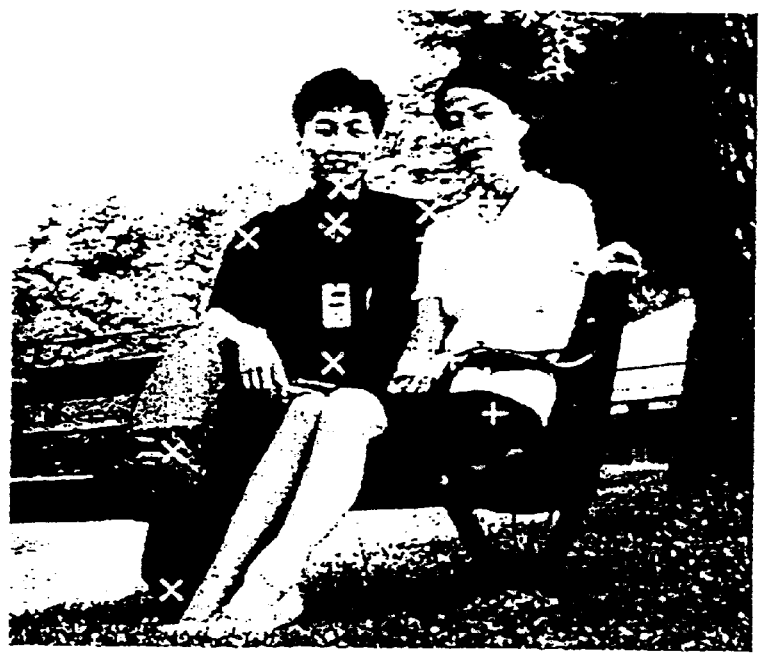
FIG. 3 shows an example of characteristic point extraction for a person object.

FIG. 3 shows an example of characteristic point extraction for a person object.

In FIG. 3, there are shown the joint points extracted for two person objects, where the two extracted points each represented as a group of '+' symbols and a group of 'x' symbols show the joint points each representing one person object, which are extracted based on the joint point model shown in FIG. 1.

If there exist person objects, the extracted joint point information corresponding to the representative pictures transmitted from the scene change and key-frame detector 2-2 and from the joint point model based joint point extraction and representer are input to the joint point model based shot analysis and contents based video indexer 2-5. The joint point model based shot analysis and contents based video indexer 2-5 performs the contents based indexing process which performs analysis of the contents within the shots from the input pictures and the corresponding joint points or of the relationship between the shots. The contents analysis into the shots includes pose tracking, etc. within the shots of the person object using color information extraction and representation for one person object on the basis of the joint points and pose information on the basis of the joint points. The analysis of the relationship between the shots may include an interaction of dialogue screen between persons, which commonly occur among moving picture data. Through this joint point based shot analysis and indexing, since an interact relationship between a series of shots is found in case of moving picture, a content analysis one step higher than the content based shot is made possible.

The indexing information output from the joint point model based shot analysis and contents based video indexer 2-5 is stored at a suitable position within the moving picture/still picture data and indexing information storage along with multimedia data and then is used for retrieval based on these indexing information upon content based retrieval.

Figure 4:
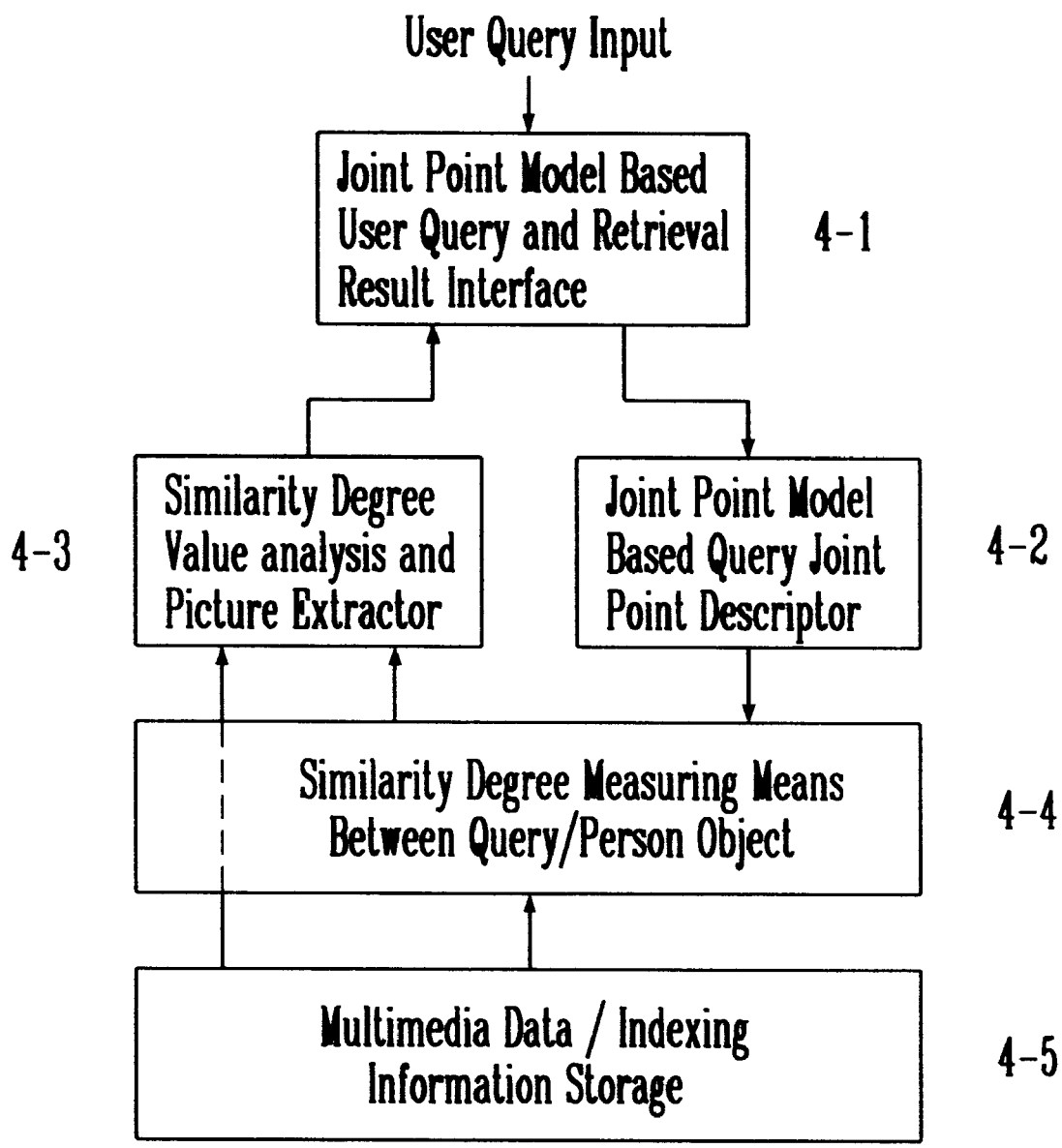
FIG. 4 is a structural view of joint points model based retrieval system.

FIG. 4 is a structural view of joint points model based retrieval system, which allows a user to retrieve he/his desired information using the above extracted and stored indexing information.

In FIG. 4, a reference numeral 4-1 is joint points model based user query and retrieval result interface, 4-2 is joint points model based query joint point descriptor 4-3 is an similarity degree value analysis and picture extractor, 4-4 is a similarity degree measuring means between query/person object and 4-5 is a moving picture/still picture and indexing information storage.

The joint point model based user query and retrieval result interface 4-1 functions to provide a query input interface for allowing an initial user to find a desired person object. If the query by the joint point model is input from the joint point model based user query and retrieval result interface 4-1 to the joint point model based query joint point descriptor 4-2, the joint point model based query joint point descriptor 4-2 generates the joint point model based representation from the query input by the user and then transmits it to the similarity degree measuring means between query/person object. The similarity degree measuring means between query/person object 4-4 functions to perform an similarity degree measurement on various characteristics between the indexing information stored at the storage and the person objects input by the query. At this time, the values of the similarity degree per each measured characteristic each is sent to the similarity degree value analysis and picture extractor 4-3. The similarity degree value analysis and picture extractor 4-3 receives from the moving picture/still picture and indexing information storage 4-5 representative pictures or still pictures being high at analogy degree in total into which a weighed value per each similarity degree is considered.

The total similarity degree indicates a synthetic similarity degree which is calculated from the analogy degree per each characteristic, by comparing the value represented by means of the joint point model per each characteristic for representative pictures or still pictures within each moving picture calculated from the similarity degree measuring means between query/person object 4-4 with the value represented by the joint point model for the query, considering the weighted value per characteristic specified by the user. The picture, being high in total similarity degree, is the picture what the user wants to find and which is similar to the query input, and it is transmitted to the user through the user interface of the joint point model based user query and retrieval result interface.

The characteristic similarity degree by means of the joint point model may includes a scale similarity degree of a person object, a position similarity degree, a pose similarity degree, a color information similarity degree, an in-time pose similarity degree within shot, a construction similarity degree between shot, etc.

Now, the above description will be further explained by reference to the accompanying drawings.

The joint point model based indexing apparatus shown in FIG. 2 extracts and stores joint points for a person object from moving pictures or still pictures which is the object of retrieval. At this time, the joint point model may include 15 joint point models as shown in FIG. 1. The joint point model in FIG. 1 may be expanded to represent a more detailed representation of a person object. In FIG. 2, if a moving picture is input from the 2-1 block, the 2-2 block detects screen switchings, divides them by shot unit and then extracts representative pictures from them. The representative pictures may be more than one picture, and the scene switching detection and the representative picture extraction technology may be used a conventional one. If a still picture is input from the moving picture/still picture data and indexing information storage 2-1, it is directly input to the joint point model based joint point extraction and descriptor 2-4. The joint point model based joint point extraction and descriptor 2-4 extracts and represents the joint point for the input picture on the basis of the joint point model, in case that a person object exits.

The user interface for joint point extraction 2-3 is a user interface block for extracting joint points for a person object in a manual way or a semi-manual way. If the joint point is automatically extracted, the user interface for joint point extraction 2-3 does not an additional function.

FIG. 3 shows an example of joint points which are extracted from the joint point model based joint point extraction and descriptor 2-4 through the user interface for joint point extraction 2-3. In FIG. 3, there exist two person objects within a picture, where points each corresponding to the joint points, respectively, are extracted on the basis of the joint point model for each person object. At this time, the points should be extracted according to the number per each joint on the basis of the joint point model shown in FIG. 2. The joint point model based joint point extraction and descriptor 2-4 in FIG. 2 functions to output the contents representing the joint points to the joint point model based shot analysis and contents based video indexer 2-5 according to the scheme representing the extracted joint points. The following mathematical Equation 1 is one example of joint point representation scheme which is expressed using a position vector for each of the joint points.

$$HPD_1 = \{JP_i = (x_i, y_i) 1 \leq i \leq 15\}, \quad \text{[Equation 1]}$$

where $(x_i, y_i)$ is i-th joint point position vector, $(x_i, y_i) = (-1, -1)$, if i-th joint point does not exists.

The joint point model based shot analysis and contents based video indexer 2-5 analyzes additional contents of a picture from the contents representing the joint points which are transmitted from the joint point model based joint point extraction and descriptor 2-4. The additional picture contents analysis may include a color information, a pose information, a quality information, an occurrence frequency of a same person object and an interaction analysis between person objects on the basis of the joint points, and a semantic collection of a shot through the interaction analysis between person objects, etc. These information is indexed along with the information representing the joint points for the joint point model based person object and then stored at the moving picture/still picture data and indexing information storage 2-1.

When the indexing for the retrieval object data is completed by the joint point model based indexing apparatus in FIG. 2, the user can retrieve he/his desired person object using the joint point model based retriver in FIG. 4. Next, the user inputs the query joint point and its related information using the joint point model based user query and retrival result interface 4-1.

Figure 5:
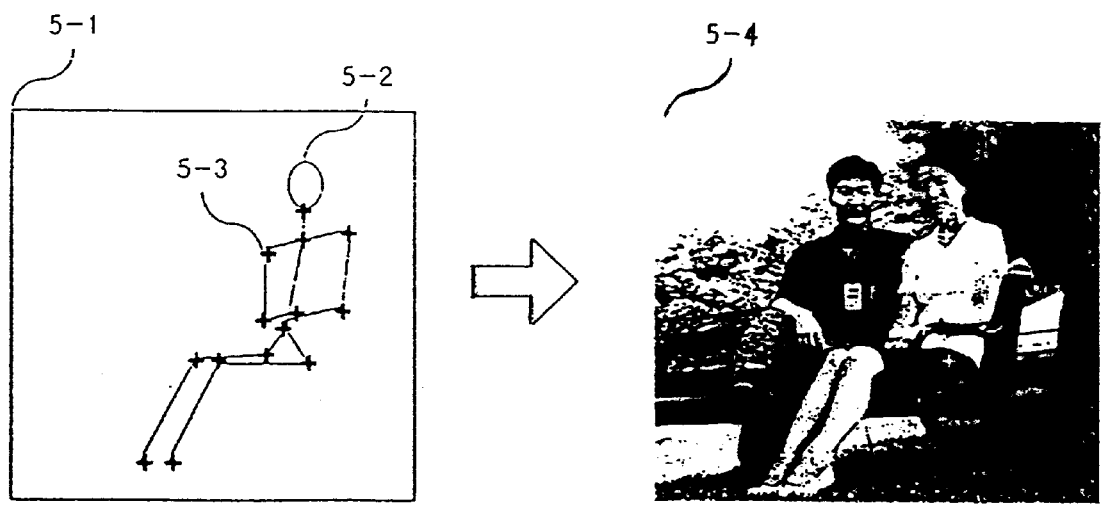
FIG. 5 shows an example of retrieval by means of query input.

FIG. 5 shows one example of the query input and retrieval.

A query input window 5-1 is provided through the joint point model based user query and retrieval result interface 4-1 in FIG. 4, which allows the user to sketch the person object 5-2 what he/she wants to retrieve through the input window and then to input the joint points 5-3 on the basis of the joint point model. It also provides the retrieval result screen 5-4 to the user through the joint point model based user query and retrival result interface 4-1 in FIG. 4.

The detailed description for the retrieval procedure will be now explained.

The retrieval procedure for the person object is performed in the joint point model based retrieval apparatus in FIG. 4. At this time, the moving picture/still picture and indexing information storage 4-5 performs a same function to the moving picture/still picture data and indexing information storage 2-1 used in the joint point model based indexing apparatus of FIG. 2, and also stores moving pictures and still pictures being the object of retrival and joint points model based indexing information corresponding them.

The joint point model based query joint point descriptor 4-2 represents the joint points input through the query interface of the joint point model based user query and retrieval result interface 4-1, one example of which is represent as equation 1. At this time, the user can provide additional information to the joint point through the query interface. For example, they may include color information, pose informations, etc. and these information are input with the joint points concerned.

The similarity degree measuring means between query/ person object 4-4 receives an indexing information from the moving picture/still picture and indexing information storage 4-5 and also joint points based query information from the joint point model based query joint point descriptor 4-2 to performs a similarity degree measurement. There may be a lot of similarity degree for the person object, which may include, for example position, pose, scale, etc.

One example of measuring the similarity degree for the position is as follows. In the present invention, the scale based on the distance of the second joint point from the query joint points and the joint points is the object of retrieval. The used scale may be expressed into the following equation 2.

$$\text{Position measure} = \frac{\max \text{ distance} - \Delta JP_2}{\max \text{ distance}}, \quad \text{[Equation 2]}$$

where $\max \text{ distance} = \sqrt{\text{width}^2 + \text{height}^2}$ $\Delta JP_2 = \sqrt{(x_{q2} - x_{d2})^2 + (y_{q2} - y_{d2})^2}$ In equation 2, the width represents the number of pixels in a horizontal direction within a frame, the height represents the number of pixels in a vertical direction within a frame, $(x_{q2}, Y_{q2})$ represents the 2nd number among the query input joint points, i.e., $JP_2$, and $(x_{d2}, y_{d2})$ represents a position vector corresponding the 2nd number among the joint points of a major person within the retrieval object frame. The retrieval results may be obtained by selecting higher position_measure by means of similarity degree measure by equation 2.

Meanwhile, one example of similarity degree measurement method for the pose is as follows.

The pose similarity degree is a barometer necessary to measure how the pose between the query input by the user and the person within the frame being the object of retrieval is similar. In the present invention, it first obtains angle distribution based on the 2nd joint point to the joint point for the retrieval object person and then uses as a barometer the difference between the 2nd joint point and the 2nd joint point's reference angle distribution of the query input joint point. The used barometer can be expressed into the following equation 3.

$$\theta_i = \frac{180}{\pi} A\text{Tan}(JP_i - JP_2) \quad \text{[Equation 3]}$$
$$= \frac{180}{\pi} A\text{Tan}((y_i - y_2)/(x_i - x_2)) \quad \text{if } x_i, y_i = -1$$

In equation 3, the italic alphabet i is the value which is calculated from the angle of the 2nd joint point $JP_2$ reference in the i-th joint point Jpi. This angle value of each joint point is calculated for all the existing joint points among the total 14 joint points except for the 2nd joint point.

In a same manner, after the angle is also calculated for the joint points input by query, the difference in the angle between the query joint point and the joint point being the object of retrieval can be obtained as equation 4.

$$\Delta\theta_i = \begin{bmatrix} |\theta_{di} - \theta_{qi}| & \text{if } |\theta_{di} - \theta_{qi}| \leq 180 \\ 360 - |\theta_{di} - \theta_{qi}| & \text{if } |\theta_{di} - \theta_{qi}| > 180 \\ 0 & \text{if } JP_{qi}, JP_{di} = (-1, -1) \end{bmatrix} \quad \text{[Equation 4]}$$

In equation 4, the italic alphabet represents the value of difference in the angle between the query joint point corresponding to the i-th joint point and the joint point of the retrieval object data. The difference in the angle will be 180° in maximum, but if there does not exist a corresponding joint point it will have the value of 0. The pose_measure between the query using the angle difference component and the retrieval object can be calculated as the following equation 5.

$$\text{Pose measure} = \frac{1}{M} \sum_{i \ne [1,3,\ldots 15]} \frac{(\text{max angle} - \Delta\theta_i)}{\text{max angle}}, \quad \text{[Equation 5]}$$

where max angle = 180

$M$ is number of joint points, $JP_{qi}$ or $JP_{di} = (-1, -1)$

In equation 5, M means the total number of the joint points where the query joint point or the joint point being the object of retrieval is commonly existing among the 14 joint points except for $JP_2$. In equation 5, the pose_measure can be calculated as the sum of the values in which the angle difference value of the joint points between the query calculated in equation 1 and the data being the object of retrieval is normalized.

The scale_measure within the screen of a person is used for the purpose of considering that the scale of the person object will be different if it has a same position and pose. The condition such as regardlessness of the scale and also the scale_measure can be input by not only considering the position and the pose but also considering the scale_measure with the query joint point. In other words, it measures the distance within the frame between $JP_1$ and $JP_2$, for each of the query joint point and the joint point being the object of retrieval as a barometer and calculates the scale_measure as equation 6.

$$JP_{1,2} = \sqrt{(x_2 - x_1)^2 + (y_2 - y_1)^2} \quad \text{[Equation 6]}$$

$$\text{Scale measure} = \begin{cases} JP_{ql.2}/JP_{dl.2}, & \text{if } JP_{dl.2} \ge JP_{ql.2} \\ JP_{dl.2}/JP_{ql.2}, & \text{if } JP_{dl.2} < JP_{ql.2} \end{cases}$$

Each of the above similarity degrees is a barometer for position, pose and scale which represent the characteristic of a person object and retrieves a synthetic measure value as a basis by adding a weighted value to the similarity degree for each of the characteristics. The total similarity degree being a synthetic similarity is determined by equation 7.

$$\text{Similarity} = \alpha \cdot \text{Position\_measure} + \beta \cdot \text{Pose\_measure} + \gamma \cdot \text{Scale\_measure} \quad \text{[Equation 7]}$$

In order to find a person object most similar to the query input, the present invention calculates the query joint points and each of the joint points of all the person object being the object of retrieval from the total similarity in equation 7, finds a representative frame in which a person object having the highest similarity exists or the pose of shot, and then outputs the result to the user.

The joint point model based user query and retrieval result interface 4-1 in FIG. 4 allows the user to control the weighted values α, β, γ for each of the position, pose and scale similarities.

Upon performing the joint point model based retrieval, if it performs the indexing in consideration of color information, pose information, relative position information between person objects, etc. in addition to the position, pose and scale, the total similarity degree can be calculated in consideration of the similarity degree for the corresponding characteristic in addition to the position, pose, scale similarity components in equation 7.

As described above, the retrieval method based on the joint point model according to the present invention is disclosed which can be used to find a desired scene on the basis of shape or pose of a person object from video data such as moving pictures, still pictures, etc. This joint point model based on the retrieval method will be especially effective when implementing a multimedia database by which a user can retrieve the contents concerned with a desired person object within a large capacity of a video data which is increased with a multimedia compression technology advanced in time. Furthermore, when using joint points model, the method according to the present invention allows various shapes of user query inputs by indexing various fundamental characteristic elements based on the joint point, for example color information, pose information, quality information, etc.

While the present invention has been described and illustrated herein with reference to the preferred embodiment thereof, it will be understood by those skilled in the art that various changes in form and details may be made therein without departing from the spirit and scope of the invention.

What is claimed is:

1. A method of retrieving moving pictures using joint points based on pose information, comprising the steps of:

extracting and expressing joint points of a joint point model existing in moving pictures or still pictures which are the object of retrieval by using an indexing apparatus and a retrieving apparatus based on a joint point model; and retrieving a person which is an object of retrieval according to the joint points extracted from said indexing apparatus by using a retrieving apparatus based on a joint point model, wherein said retrieving apparatus comprises:

joint point model based user query input and retrieval result interface for providing joint points information and their related information which allow a user to find a desired person which is an object of retrieval or providing the retrieval result screen to the user;

joint point model based query point representing means for representing the joint points input through said joint point model based user query and retrieval result interface;

moving picture/still picture data and indexing information storage for storing the representative pictures or still pictures which are higher in a total similarity degree in consideration of weighted values per respective similarity degree which is defined by the user;

similarity degree measuring means between query/person object for performing similarity degree measurement on various characteristics between the person object input by the query on the basis of the joint points represented from said joint point model based query joint point representing means and the indexing information stored at said moving picture/still picture data and indexing information storage; and similarity degree analysis and picture extracting means for performing a similarity degree measurement from the value of similarity degree per respective characteristics which are measured from said similarity degree measuring means between query/person object and the indexing information which is stored at said moving picture/still picture data and indexing information storage, and sending the results to the user through said joint point model based user query input and retrieval result interface.

2. The method of retrieving moving pictures using joint points based on pose information as claimed in claim 1, wherein said indexing apparatus comprises:

moving pictures/still pictures data and indexing information storage for storing moving pictures or still pictures data which are the object of retrieval;

scene change and key-frame detecting means for receiving the moving picture data output from said moving pictures/still pictures data and indexing information storage as inputs, dividing said moving pictures into respective time axes with shots by scene change and then determining representative pictures corresponding to respective shots;

joint point extraction user interface for extracting joint points of a person which is an object of retrieval in a manual way or a semi-manual way;

joint point model based joint point extraction and description means for receiving the moving picture data output from said moving pictures/still pictures data and indexing information storage and the joint point information extracted through said joint point extraction user interface as inputs, and then representing the joint point information corresponding to the representative pictures; and joint point model based analysis and contents based video indexing means for receiving the representative pictures transmitted from said scene change and key-frame detecting means and the joint point information transmitted from said joint point model based joint point extraction and description means, performing the contents based indexing process which analyzes the contents within the shots or the relationship between the shots, and transmitting said indexed information to said moving pictures/still pictures data and indexing information storage.

3. A method of retrieving moving pictures using joint points based on pose information as claimed in claim 1, wherein said joint points which are represented by said joint point model based query joint point representing means are expressed into the following equation 8

$$HPD_r = \{JP_i = (x_i, y_i) | 1 \leq i \leq 15\}, \quad \text{[Equation 8]}$$

where $(x_i, y_i)$ is i. th joint point position vector $(x_i, y_i) = (-1, -1)$, if i-th joint point does not exist.

4. The method of retrieving moving pictures using joint points based on pose information as claimed in claim 1, wherein the value of pose similarity degree which is measured by said similarity degree measuring means between the query/person object is expressed into the following equation 9;

$$\text{Position\_measure} = \frac{\text{max\_distance} - \Delta JP_2}{\text{max\_distance}}, \quad \text{[Equation 9]}$$

$$\text{where max distance} = \sqrt{(x_{q2} - x_{d2})^2 + (y_{q2} - y_{d2})^2}$$

where, width is the number of pixels in a horizontal direction within a frame, height is the number of pixels in a vertical direction within a frame, (xq2,yq2) is the 2nd number among the query input joint points, i.e, $JP_2$, and (xd2,yd2) is a position vector corresponding the 2nd number among the joint points of a major person within the retrieval object frame.

5. The method of retrieving moving pictures using joint points based on pose information as claimed in claim 1, wherein the value of pose similarity degree which is measured by said similarity degree measuring means between the query/person object is expressed into the following equation 10;

$$\text{Pose\_measure} = \frac{1}{M} \sum_{i=[1,3,\ldots 15]} \frac{(\text{max\_angle} - \Delta \theta_i)}{\text{max\_angle}}, \quad \text{[Equation 10]}$$

$$\text{where max\_angle} = 180$$

$M$ is a number of joint points, $Jp_{qi}$ or $Jp_{di} = (-1, -1)$ where, M is the total number of the joint points where the query joint point or the joint point being the object of retrieval is commonly existing among the 14 joint points except for $JP_2$.

6. The method of retrieving moving pictures using joint points based on pose information as claimed in claim 1, wherein the similarity degree per respective characteristics which is measured by said similarity degree measuring means between the query/person object is a scale of similarity degree, and a value of the scale similarity degree expressed into the following equation 11

$$JP_{1,2} = \sqrt{(x_2 - x_1)^2 + (y_2 - y_1)^2} \quad \text{[Equation 11]}$$

$$\text{Scale\_measure} = \begin{bmatrix} JP_{ql\_2}/JP_{dl\_2}, & \text{if } JP_{dl\_2} \geq JP_{ql\_2} \\ JP_{dl\_2}/JP_{ql\_2}, & \text{if } JP_{dl\_2} < JP_{ql\_2} \end{bmatrix}$$

where $JP_{q1-2}$ is the query joint points, and $JP_{d1-2}$ is the object joint points.

* * * * *